US 12,529,580 B2

(12) United States Patent
Robertson, Jr. et al.

(10) Patent No.: US 12,529,580 B2
(45) Date of Patent: Jan. 20, 2026

(54) SENSOR ASSEMBLY (71) Applicant: Ford Global Technologies, LLC, Dearborn, MI (US)

(72) Inventors: Michael Robertson, Jr., Garden City, MI (US); Venkatesh Krishnan, Canton, MI (US); Segundo Baldovino, Novi, MI (US); Martin D. Lopez, Oakland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 296 days.

(21) Appl. No.: 18/489,282

(22) Filed: Oct. 18, 2023

(65) Prior Publication Data
US 2025/0130079 A1   Apr. 24, 2025

(51) Int. Cl.
*G01D 11/30* (2006.01)
*B60R 11/00* (2006.01)

(52) U.S. Cl.
CPC ........ G01D 11/30 (2013.01); *B60R 2011/004* (2013.01); *B60R 2011/0085* (2013.01)

(58) Field of Classification Search
CPC .............. G01D 11/30; B60R 2011/004; B60R 2011/0085
See application file for complete search history.

(56) References Cited

U.S. PATENT DOCUMENTS

| | | | |
|---|---|---|---|
| 9,279,437 B2 * | 3/2016 | Gold | F16B 5/0216 |
| 10,490,886 B2 * | 11/2019 | Styles | F16M 11/14 |
| 10,773,273 B2 | 9/2020 | Mousavi Ehteshami et al. | |
| 11,305,741 B2 | 4/2022 | Frederick et al. | |
| 12,092,260 B2 * | 9/2024 | Kim | G01S 7/027 |
| 2021/0364631 A1 | 11/2021 | Hasegawa et al. | |
| 2022/0359130 A1 * | 11/2022 | Benjamin | H01H 9/0207 |
| 2023/0123315 A1 | 4/2023 | Huelsen et al. | |
| 2023/0146876 A1 | 5/2023 | Sviberg | |

FOREIGN PATENT DOCUMENTS

| | | | |
|---|---|---|---|
| CN | 115267739 A | 11/2022 | |
| FI | 129468 B * | 2/2022 | F16M 11/2078 |
| KR | 20080007780 A | 1/2008 | |

\* cited by examiner

*Primary Examiner* — Jamel E Williams
(74) *Attorney, Agent, or Firm* — Frank A. MacKenzie; Brooks Kushman P.C.

(57) ABSTRACT

A sensor assembly includes a carrier plate, a mounting plate, and a sensor on or over the mounting plate. The assembly can additionally include two ball studs attaching the mounting plate to the carrier plate, the ball studs defining a first axis passing through center points of the ball studs. A first adjustable screw can be positioned to tilt the mounting plate about the first axis, and a second adjustable screw can be positioned to rotate the mounting plate about a vertically oriented second axis, in which the second axis is spaced from the ball studs.

20 Claims, 8 Drawing Sheets

SENSOR ASSEMBLY

BACKGROUND

Autonomous and semi-autonomous vehicles typically include a variety of sensors. Some sensors detect the position or orientation of the vehicle, for example, global positioning system (GPS) sensors; accelerometers, such as piezo-electric or microelectromechanical systems (MEMS); gyroscopes such as rate, ring laser, or fiber-optic gyroscopes; inertial measurement units (IMU); and magnetometers. Some sensors detect objects external to a vehicle, for example, radar sensors, scanning laser range finders, light detection and ranging (lidar) devices, and image processing sensors such as cameras.

DETAILED DESCRIPTION

In an example, sensors of a sensor set, which may include a lidar sensor, may be aligned with respect to a vehicle longitudinal axis and with respect to a vehicle lateral axis. Such alignment can supplement an ability for a vehicle computer to execute program steps of a sensor fusion algorithm, which operates to combine output data from multiple sensors of the sensor set. A sensor fusion algorithm can provide an enhanced driving experience by providing a more thorough assessment of a driving environment. This disclosure describes a sensor assembly for fine-tuning this alignment of one of the sensors, e.g., the lidar sensor. The sensor assembly includes a carrier plate, a mounting plate, a sensor on the mounting plate, two ball studs attaching the mounting plate to the carrier plate, a first adjustable screw, and a second adjustable screw. The ball studs define a first axis passing through the center points of the ball studs. The first adjustable screw is positioned to tilt the mounting plate about the first axis. The second screw is positioned to rotate the mounting plate about a vertically oriented second axis, the second axis being spaced from the ball studs. This sensor assembly permits fine control of the alignment of the sensor in two rotational degrees of freedom.

In an example, a sensor assembly can include a carrier plate, mounting plate, and a sensor on the mounting plate. The sensor assembly can additionally include two ball studs attaching the mounting plate to the carrier plate, the ball studs defining a first axis passing through center points of the ball studs, a first adjustable screw positioned to tilt the mounting plate about the first axis, and a second adjustable screw positioned to rotate the mounting plate about a vertically oriented second axis, the second axis being spaced from the ball studs.

A first axis of the sensor assembly can extend along a lateral dimension with respect to a vehicle that includes the sensor assembly.

The carrier plate of the sensor assembly can be fixed to a reinforcing beam having a first lateral endpoint that is connected to a first structural component at a first side of a vehicle that includes the sensor assembly.

The reinforcing beam can include a second lateral endpoint, opposite the first lateral endpoint, connected to a second structural component at a second side of the vehicle.

The sensor assembly can additionally include an adjustable spacer that extends from the mounting plate to the carrier plate.

The adjustable spacer can include a bottom surface that makes frictional contact with a surface of the carrier plate.

The adjustable spacer can be spaced from the second axis.

The carrier plate of the sensor assembly can include a horizontally oriented first slot, the ball studs can include a first ball stud, the mounting plate can include a first opening that is positionable above the first slot, and the first ball stud can extend through the first opening and through the first slot.

The carrier plate of the sensor assembly can include a horizontally oriented second slot, the ball studs can include a second ball stud, the mounting plate can include a second opening, and the second ball stud can extend through the second opening and through the second slot.

The first slot and the second slot of the sensor assembly can be elongated in circumferential directions relative to the second axis.

The sensor assembly can also include a bushing that can be fixed relative to the mounting plate, in which the bushing can accept a surface of the second adjustable screw.

The bushing can be movable with respect to the carrier plate responsive to adjustment of the second adjustable screw.

The sensor assembly can include a first torque nut, wherein the ball studs include a first ball stud, the first ball stud can be elongated from a first end to a second end, the first ball stud can include a rounded surface at the first end, and the second end of the first ball stud can be engaged with the first torque nut.

The first torque nut can make frictional contact with the carrier plate.

The sensor assembly can include a second torque nut, wherein the ball studs can include a second ball stud, the second ball stud can be elongated from a first end to a second end, the second ball stud can include a rounded surface at the first end, and the second end of the second ball stud can be engaged with the second torque nut.

The first axis can be horizontally oriented.

The first adjustable screw can be fixed to the carrier plate.

The second adjustable screw can be fixed to the carrier plate.

The first adjustable screw can include a receiver shaped to accept an adjustment tool, the receiver of the first adjustable screw being positioned on a surface accessible from inside a vehicle on which the sensor assembly can be mounted.

The carrier plate can be mounted on a roof of a vehicle, and the sensor assembly can include a fluid channel positioned to channel fluid incident on the sensor assembly in a direction away from a windshield of the vehicle.

Figure 1:
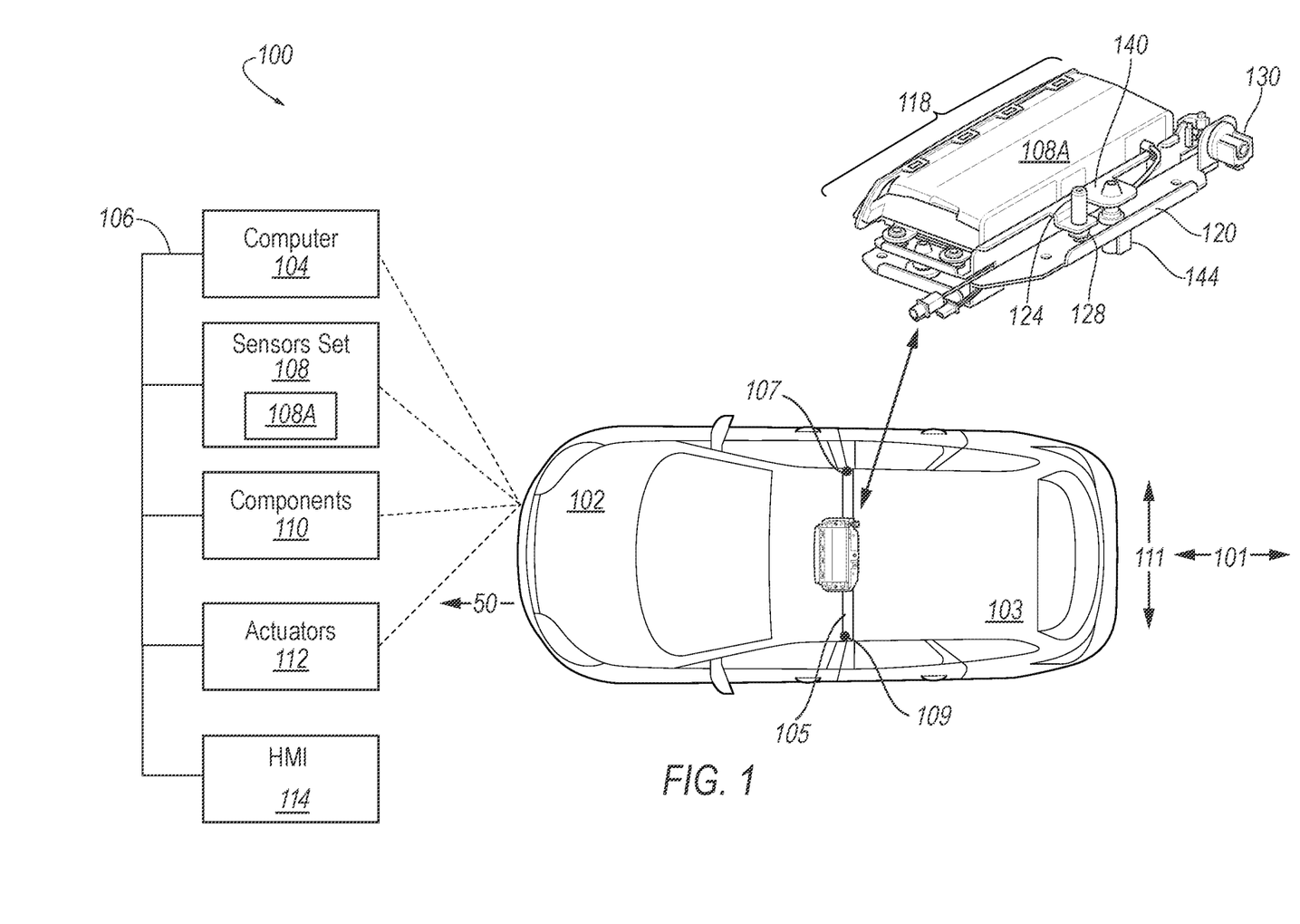
FIG. 1 is a block diagram of an example vehicle.

With reference to the Figures, wherein like numerals indicate like parts throughout the several views, FIG. 1 is a block diagram of an example vehicle 100. Vehicle 100 can include a land vehicle, such as a car, truck, a sport utility vehicle, a recreational vehicle, a crossover, a van, a minivan, a taxi, a bus, etc. Vehicle 100 includes body 102. Vehicle 100 may be of a unibody construction, in which a frame and body 102 of vehicle 100 are a single component. Vehicle 100 may, alternatively, be of a body-on-frame construction, in which the frame supports body 102 that is a separate component from the frame. The frame and body 102 may be formed of any suitable material, for example, steel, aluminum, etc.

Vehicle 100 includes computer 104, which may utilize vehicle communications bus 106 to communicate with sensor set 108, vehicle components 110, actuators 112, and human-machine interface (HMI) 114. Computer 104 may include programming to operate one or more of propulsion (e.g., control of the velocity of the vehicle by controlling one or more of an internal combustion engine, electric motor, hybrid engine, etc.), steering, climate control, interior and/or exterior lights, etc. Actuators 112 can be implemented via circuits, chips, indicators (e.g., lamps, audible indicators, haptic indicators), motors (e.g., stepper motors), and/or other electronic and/or mechanical components that can actuate various vehicle subsystems in accordance with appropriate control signals.

Vehicle communications bus 106 can include an internal wired and/or wireless network, such as a controller area network (CAN) or the like, and/or other wired and/or wireless mechanisms. Vehicle computer 104 includes a processor and a memory, which can include one or more forms of computer-readable media, and stores instructions executable by vehicle computer 104 for performing various operations, including those disclosed herein.

Computer 104 may include or be communicatively coupled to more than one processor, e.g., included in electronic controller units (ECUs) or the like included in vehicle 100 for monitoring, operating, and/or controlling various vehicle actuators 112, e.g., a powertrain actuator, a steering actuator, electromechanical actuators etc. Further, vehicle computer 104 can receive signals, via a communications subsystem, from a satellite positioning system (e.g., GPS). In an example, computer 104 may obtain an estimate of the position of vehicle 100, which may include, for example, fusing output data from sensor set 108 with satellite positioning signals from GPS satellites. The location data may be in a known form, e.g., geo-coordinates in a global-reference frame (i.e., latitudinal and longitudinal coordinates).

Sensor set 108 of vehicle 100 can include any sensor for detecting the attributes of an environment external to vehicle 100, such as objects and/or characteristics of surroundings of vehicle 100. Accordingly, sensor set 108 may operate to detect other vehicles, road markings, traffic lights and/or signs, buildings, etc. For example, sensor set 108 may include radar sensors, ultrasonic sensors, scanning laser range finders, light detection and ranging (lidar) devices (e.g., lidar sensor 108A), and image processing sensors such as cameras. As shown in FIG. 1, lidar sensor 108A may be positioned on or over an upper structure (e.g., vehicle roof 103) of vehicle body 102 so as to provide detection and ranging of stationary or moving objects in directions forward of vehicle 100 as the vehicle travels along path 50. Sensor set 108 can include a variety of additional devices, which may be mounted at a top portion of vehicle body 102, at a rear portion of vehicle body 102, at a front windshield, around vehicle body 102, etc. Such sensors may provide relative locations, sizes, and shapes of objects and/or conditions surrounding vehicle body 102. Sensors of sensor set 108 may cooperate with each other to provide sensor fusion capabilities utilizing programming of computer 104. For example, lidar sensor 108A may cooperate with a camera sensor to provide, for example, a range to a camera-detected object. Thus, in an example, a camera device of sensor set 108 may capture an image of a stationary or moving object located in a forward direction with respect to vehicle 100. Lidar sensor 108A may then provide range data, which may permit sensor fusion processing programming of computer 104 to determine a distance between the camera-detected object and the vehicle.

Sensor assembly 118, which may include lidar sensor 108A, can be mounted on or over roof 103 of vehicle body 102 so as to provide a field-of-view that includes areas in a forward direction with respect to vehicle body 102. In an example, a first (lateral) axis of sensor assembly 118 can extend along a lateral dimension (e.g., parallel to vehicle lateral axis 111). In an example, a second (longitudinal) axis of sensor assembly 118 can extend along a longitudinal dimension (e.g., parallel to vehicle longitudinal axis 101). In an example, sensor assembly 118 can be positioned outside of an area occupied by the windshield (e.g., windshield 805 of FIG. 8) of vehicle 100. Lidar sensor 108A can be mounted on or over mounting plate 140. Mounting plate 140 can be attached to carrier plate 120 and be positionable with respect to carrier plate 120.

Carrier plate 120 can be fixed or mounted to reinforcing beam 105 utilizing any suitable fasteners. Reinforcing beam 105 can be oriented along, or parallel to, vehicle lateral axis 111. Reinforcing beam 105 can include first lateral endpoint 107, which is connected to a first structural component at a first side of vehicle body 102. Reinforcing beam 105 can additionally include second lateral endpoint 109, which is connected to a second structural component at a second side of vehicle body 102 that is opposite the first side of the vehicle body. Accordingly, reinforcing beam 105 is capable of supporting the weight of sensor assembly 118, which includes lidar sensor 108A, during operation of vehicle 100.

In an example, during manufacturing operations of vehicle 100, sensor assembly 118 can be attached to reinforcing beam 105. As described in reference to FIGS. 3-6 herein, adjustment of a tilt angle of mounting plate 140 with respect to carrier plate 120 (attached to vehicle roof 103) can be accomplished by inserting an adjustment tool into a receiver (e.g., 544 of FIG. 5) of first adjustable screw 144. Via adjustment of first adjustable screw 144, mounting plate 140 can be tilted in an upward or downward direction about horizontally oriented axis 380. Mounting plate 140 may additionally be adjusted about vertically oriented axis 390 by inserting an adjustment tool into a receiver (e.g., 630 of FIG. 6) of second adjustable screw 130. Via adjustment about vertically oriented axis 390 of second adjustable screw 130, mounting plate 140 can be oriented so as to be aligned with, for example, longitudinal axis 101 of vehicle body 102. Accordingly, via adjustment about horizontally oriented and vertically oriented axes (e.g., 380, 390), lidar sensor 108A can be aligned with other sensors of sensor set 108.

Figure 3:
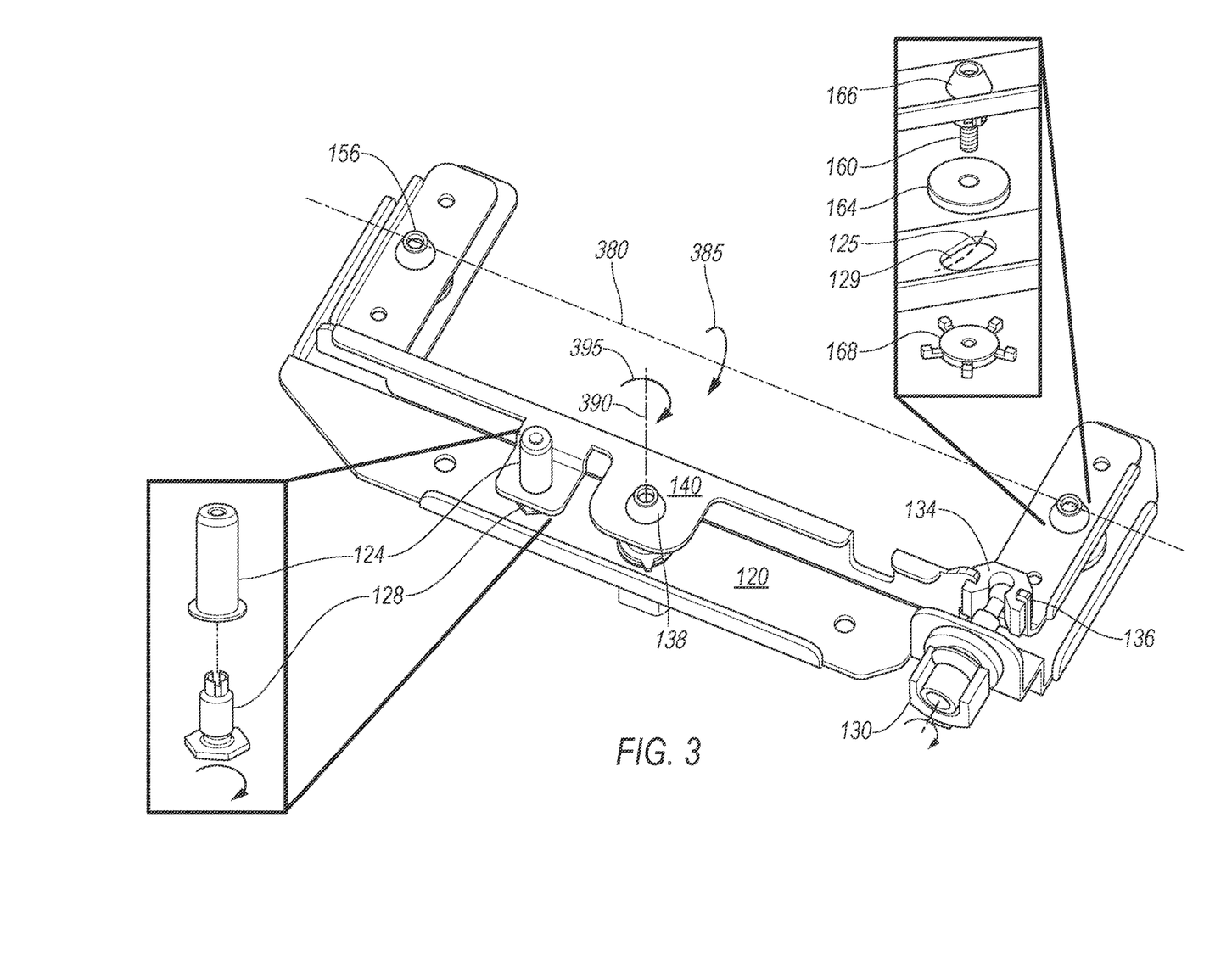
FIG. 3 is a top perspective view of components of the sensor assembly.

As described in greater detail in reference to FIG. 3, responsive to adjustment of mounting plate 140 about horizontally and vertically oriented axes (e.g., 380, 390), carrier plate lock 124 and threaded adjustable spacer 128 can cooperate to maintain spacing between a downward facing surface of mounting plate 140 and an upward facing surface of carrier plate 120. In an example, such as shown in FIG. 3, a downward facing surface of threaded adjustable spacer 128 makes frictional contact with an upward facing surface of carrier plate 120 so as to restrain spacer 164 from movement with respect to carrier plate 120. Accordingly, mounting plate 140 can be fixed into place relative to carrier plate 120 and vehicle roof 103. In an example, adjustment of first adjustable screw 144 and second adjustable screw 130 can result in limiting the angular displacement of lidar sensor 108A with respect to longitudinal axis 101 axis of vehicle body 102 by less than a threshold amount, such as between 2° and 5°.

Figure 2:
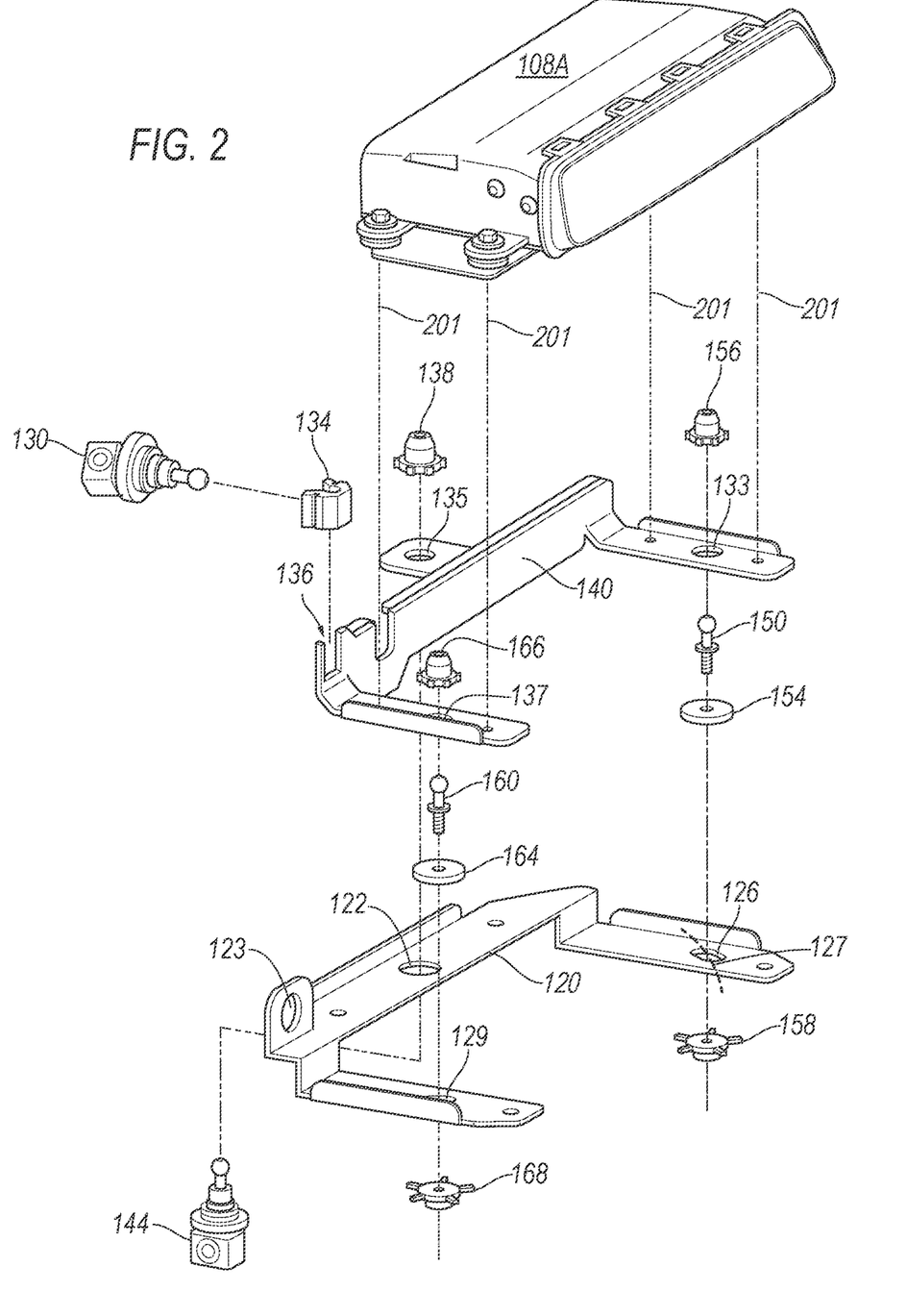
FIG. 2 is an exploded perspective view of an example sensor assembly of the vehicle.

FIG. 2 is an exploded perspective view of example sensor assembly 118 of the vehicle. As shown in FIG. 2, lidar sensor 108A may be mounted to mounting plate 140 utilizing any suitable fasteners. As shown in FIG. 2, a downward facing panel of lidar sensor 108A can include four fasteners that may be inserted into corresponding holes of mounting plate 140 indicated, for example, by dotted lines 201. Lidar sensor 108A can then be fixed into place with respect to mounting plate 140 utilizing screws, bolts, or any other type of fasteners capable of securing lidar sensor 108A to mounting plate 140.

Mounting plate 140 may, in turn, be secured to carrier plate 120, which may be secured to vehicle roof 103 (of FIG. 1) of vehicle body 102. The position of mounting plate 140 may be adjusted about a horizontally oriented axis (e.g., 380 of FIG. 3) with respect to carrier plate 120. In addition, the position of mounting plate 140 may be adjusted about a vertically oriented axis (e.g., 390 of FIG. 3) with respect to carrier plate 120. Mounting plate 140 and carrier plate 120 can both be formed from a metallic material, such as aluminum, steel, etc., or may be formed from a suitable plastic material, such as acrylonitrile butadiene styrene. For clarity of illustration, carrier plate lock 124 and threaded adjustable spacer 128 are not shown in FIG. 2. Carrier plate lock 124 and threaded adjustable spacer 128 are shown in FIG. 3.

Mounting plate 140 can include horizontally oriented surfaces to which a downward facing panel of lidar sensor 108A can fixed. In an example, mounting plate 140 may be suitable for bearing the weight of lidar sensor 108A, which may be between 2.0 kilograms and 4.0 kilograms. A vertically oriented portion of mounting plate 140 can abut a rear panel of lidar sensor 108A. Mounting plate 140 can include opening 133, positioned at the horizontally oriented left side portion of mounting plate 140. Mounting plate 140 can include opening 137, positioned at the horizontally oriented right-side portion of mounting plate 140.

Ball stud caps 156 and 166 can be fitted within openings 133 and 137, respectively. In the example of FIG. 2, ball stud caps 156 and 166 can each include a tapered first outer end to permit the first outer end of ball stud caps 156 and 166 to be pressed upwards through openings 133 and 137, respectively, from the downward-facing surface of mounting plate 140. In such an example, ball stud caps 156 and 166 can include a circumferential groove or notch that provides a mechanical stop responsive to insertion in an upward direction of the tapered first outer end of ball stud caps 156 and 166 into openings 133 and 137 (respectively). Ball stud caps 156 and 166 may include a rounded internal cavity, which can accept rounded surfaces of ball studs 150 and 160, respectively.

In the example of FIG. 2, ball studs 150 and 160 can be elongated from a rounded first end to a threaded second end. After fitting ball stud cap 156 within opening 133, the rounded surface at the first end of ball stud 150 may be urged in an upward direction so as to be positioned with ball stud cap 156. Likewise, after fitting ball stud cap 166 within opening 137, a rounded surface at a first end of ball stud 160 may be positioned within ball stud cap 166.

Mounting plate 140 may be additionally supported by a rounded surface of first adjustable screw 144, an elongated portion of which may pass upwardly through carrier plate opening 122 and through opening 135 located adjacent to a vertically oriented portion of mounting plate 140. Similar to ball stud caps 156 and 166, ball stud cap 138 may include a tapered first outer end which may permit the first outer end of ball stud cap 138 to be pressed upward through opening 135 from the downward facing surface of mounting plate 140. Ball stud cap 138 can include a circumferential groove or notch that provides a mechanical stop in response to insertion in an upward direction of the tapered first outer end of ball stud cap 138 into opening 135.

Similar to rounded surfaces of ball studs 150 and 160, first adjustable screw 144 can include a rounded surface at a first end that may be positioned within a rounded internal cavity of ball stud cap 138. In the example of FIG. 2, via adjustment of first adjustable screw 144, the rounded surface at the first end of first adjustable screw 144 can be extended or retracted, thus permitting mounting plate 140 to tilt about a horizontally oriented axis (e.g., horizontally oriented axis 380 shown in FIG. 3) that passes through the center points of the rounded surfaces of ball studs 150 and 160.

As shown in FIG. 2, in addition to a rounded surface at a first end, ball studs 150 and 160 can include a flared or flanged middle portion having a diameter greater than openings 133 and 137, respectively. Accordingly, the flared or flanged middle portion of ball studs 150 and 160 are capable of coming into contact with the downward facing side of mounting plate 140. In an example, spacer 154 can be slid over a threaded second end of ball stud 150 to maintain spacing between a left horizontal surface of mounting plate 140 and carrier plate 120. Threading of torque nut 158 can then be engaged with the threaded second end of ball stud 150 and rotated in an angular direction until torque nut 158 comes into frictional contact with a downward facing surface at the left side of carrier plate 120. Similarly, in the example of FIG. 2, spacer 164 can be slid over a threaded second end of ball stud 160 to maintain spacing between a right horizontal surface of mounting plate 140 and carrier plate 120. Threading of torque nut 168 can then be engaged with the threaded second end of ball stud 160 and rotated in an angular direction until torque nut 168 comes into frictional contact with a downward facing surface at the right side of carrier plate 120. Thus, in accordance with the example of FIG. 2, adjustment of first adjustable screw 144 may operate to rotate mounting plate 140 about a horizontally oriented axis that passes between center points of rounded first ends of ball studs 150 and 160 (e.g., horizontally oriented axis 380 of FIG. 3). Spacers 154/164 and torque nuts 158/168 can be then adjusted so as to fix mounting plate 140 at a suitable spacing from carrier plate 120.

Mounting plate 140 additionally includes notch 136, within which bushing 134 can be inserted. Bushing 134 can include a first groove positioned at the left side of bushing 134 and a second groove positioned at the right side of the bushing. In the example of FIG. 2, grooves of bushings 134 can permit the bushing to slide or to be pressed in a downward direction to be received by notch 136. Bushing 134 can include a rounded (e.g., at least partially cylindrical) internal surface, which may be capable of receiving a rounded first end of second adjustable screw 130. Bushing 134 may thus be movable with respect to carrier plate 120 responsive to adjustment of second adjustable screw 130.

In the example of FIG. 2, second adjustable screw 130 can include one or more tapered retractable (e.g., spring-loaded)

spars, which may operate to retract in response to insertion into opening 123 of carrier plate 120. Second adjustable screw 130 can be adjusted to extend and retract the rounded surface at a first end in a horizontal direction. Accordingly, via such extension or retraction of the first end of second adjustable screw 130, bushing 134 (within notch 136) of mounting plate 140 can pivot about the vertical axis of first adjustable screw 144. Such pivoting of bushing 134 within notch 136 permits mounting plate 140 to rotate about the vertical axis of first adjustable screw 144. Accordingly, mounting plate 140 is capable of adjustment about a vertically oriented axis (e.g., 390 of FIG. 3) to align, for example, with longitudinal axis 101 of vehicle body 102.

As shown in FIG. 2, carrier plate 120 includes slot 126, which may be elongated in a circumferential direction (e.g., as indicated by dotted line 127) relative to a vertically oriented axis (e.g., 390 of FIG. 3) of first adjustable screw 144. Accordingly, during a process of adjusting mounting plate 140 with respect to carrier plate 120, torque nut 158 and torque nut 168 can be loosened so as to bring the torque nuts out of frictional contact with the downward facing surface of carrier plate 120. Mounting plate 140 can then be adjusted about a vertically oriented axis (e.g., 390) via insertion, for example, of a tool into a receiver (e.g., 630 of FIG. 6) of second adjustable screw 130. Insertion of a tool into the receiver (e.g., 630) of second adjustable screw 130 permits a rounded surface at a first end of the adjustable screw rotate mounting plate 140 with respect to the vertically oriented axis (e.g., 390) of first adjustable screw 144 so as to bring mounting plate 140 into suitable alignment with longitudinal axis 101 of vehicle body 102. After achieving such suitable alignment, torque nuts 158 and 168 can be tightened so as bring to torque nuts 158 and 168 into frictional contact a downward facing surface of carrier plate 120.

FIG. 3 is a top perspective view of components of sensor assembly 118. As shown in FIG. 3, mounting plate 140 is attached to carrier plate 120. A first rounded end of first adjustable screw 144 has been received by ball stud cap 138. Via adjustment of first adjustable screw 144, mounting plate 140 has been suitably rotated to an appropriate tilt angle, e.g., as indicated by arrow 385, about horizontally oriented axis 380. As is also shown in FIG. 3, second adjustable screw 130 has been received by a rounded inner surface (e.g., at least partially cylindrical in shape) of bushing 134, which has been positioned within notch 136. Via adjustment of second adjustable screw 130, mounting plate 140 has been suitably rotated about vertically oriented axis 390, as indicated by arrow 395.

Figure 4:
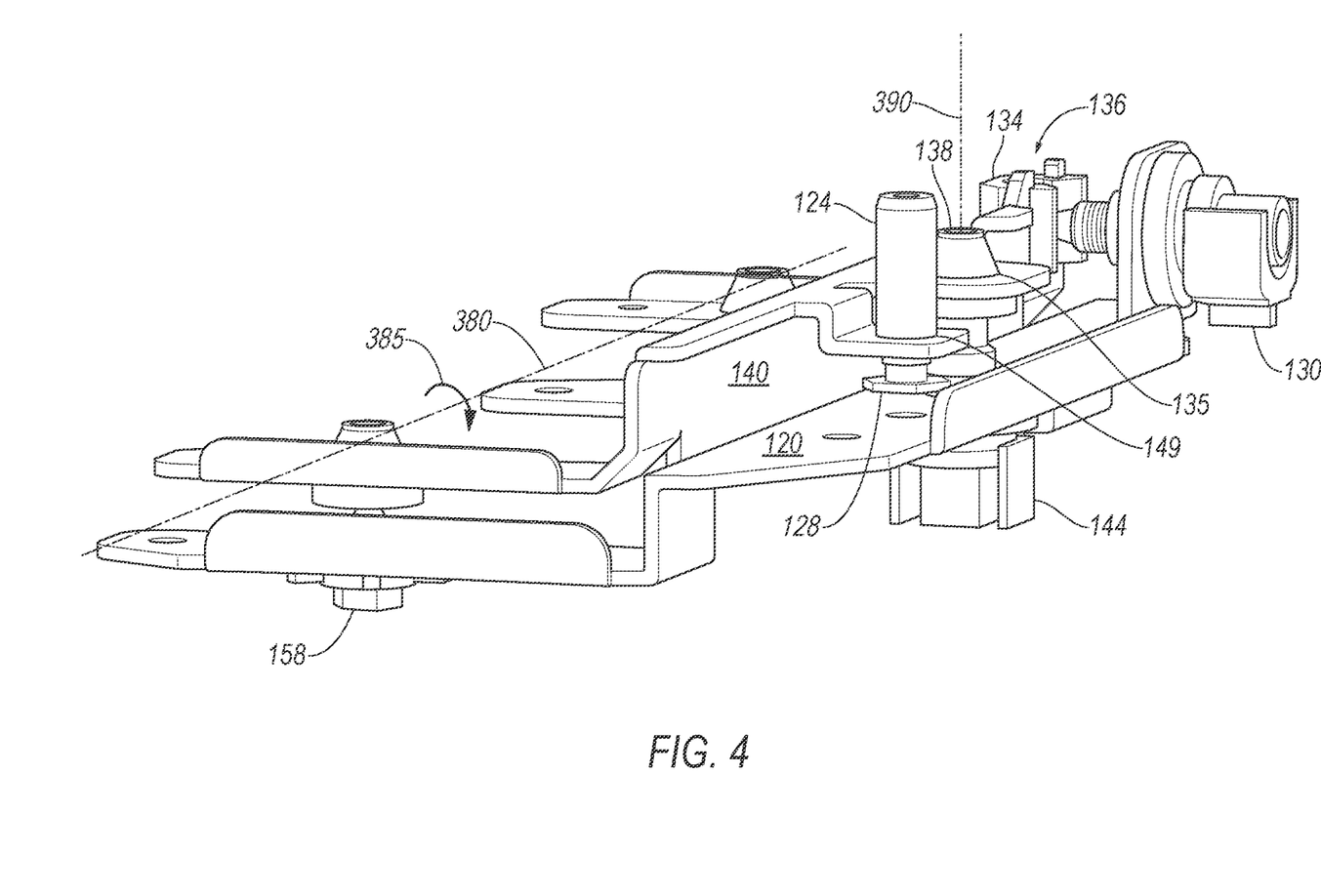
FIG. 4 is a side perspective view of components of the sensor assembly.

After positioning of mounting plate 140 about horizontally oriented axis 380 and vertically oriented axis 390, a tapered first end of carrier plate lock 124 has been inserted into an opening of a horizontally oriented surface of mounting plate 140 (as shown in greater detail in FIG. 4). In the example of FIG. 3, a second end of carrier plate lock 124 abuts a downward facing surface of the opening in horizontally oriented surface of mounting plate 140. A first end of threaded adjustable spacer 128 can then be inserted into the hollow opening at a second end of carrier plate lock 124 and angularly rotated so as to extend the second end of threaded adjustable spacer 128 until the second end of threaded adjustable spacer 128 is brought into frictional contact with an upward facing surface of carrier plate 120. Accordingly, in the example of FIG. 3, after suitable adjustment of mounting plate 140 about vertically oriented axis 390 and about horizontally oriented axis 380, carrier plate lock 124 and threaded adjustable spacer 128 can cooperate to restrain movement of mounting plate 140 in relation to carrier plate 120.

FIG. 3 additionally shows details of a rounded surface at a first end of ball stud 160 that has been inserted into, and thus retained by, ball stud cap 166. Spacer 164 can then be slid over the second (threaded) end of ball stud 160. A ridge or other feature of spacer 164 can be fitted within slot 129. Slot 129 may be elongated in a circumferential direction (e.g., as indicated by dotted line 125) relative to a vertically oriented axis (e.g., 390 of FIG. 3) of first adjustable screw 144. Ball stud 160 and spacer 164 can thus move along the direction of elongation of slot 129 when adjusting the rotational position of mounting plate 140 about vertically oriented axis 390 relative to carrier plate 120. Threaded torque nut 168 can then be engaged with the second (threaded) end of ball stud 160 and angularly adjusted until threaded torque nut 168 makes frictional contact with a downward facing surface of carrier plate 120.

FIG. 4 is a side view of components of sensor assembly 118. As shown in the example of FIG. 4, mounting plate 140 has been fixed into position relative to carrier plate 120. Mounting plate 140 may be fixed into position via adjustment of first adjusting screw 144, which may operate to rotate mounting plate 140 about horizontally oriented axis 380, and via adjustment of second adjustable screw 130, which may operate to rotate mounting plate 140 about vertically oriented axis 390. After adjustment of mounting plate 140 with respect to horizontally oriented axis 380 and vertically oriented axis 390, a tapered first end of carrier plate lock 124 has been inserted through opening 149 of mounting plate 140. Threaded adjustable spacer 128 may then be engaged with a threaded hollow second end of carrier plate lock 124. Threaded adjustable spacer may then be angularly rotated until the downward facing surface of threaded adjustable spacer 128 is suitably extended so as to come into frictional contact with an upward facing surface of carrier plate 120.

Figure 5:
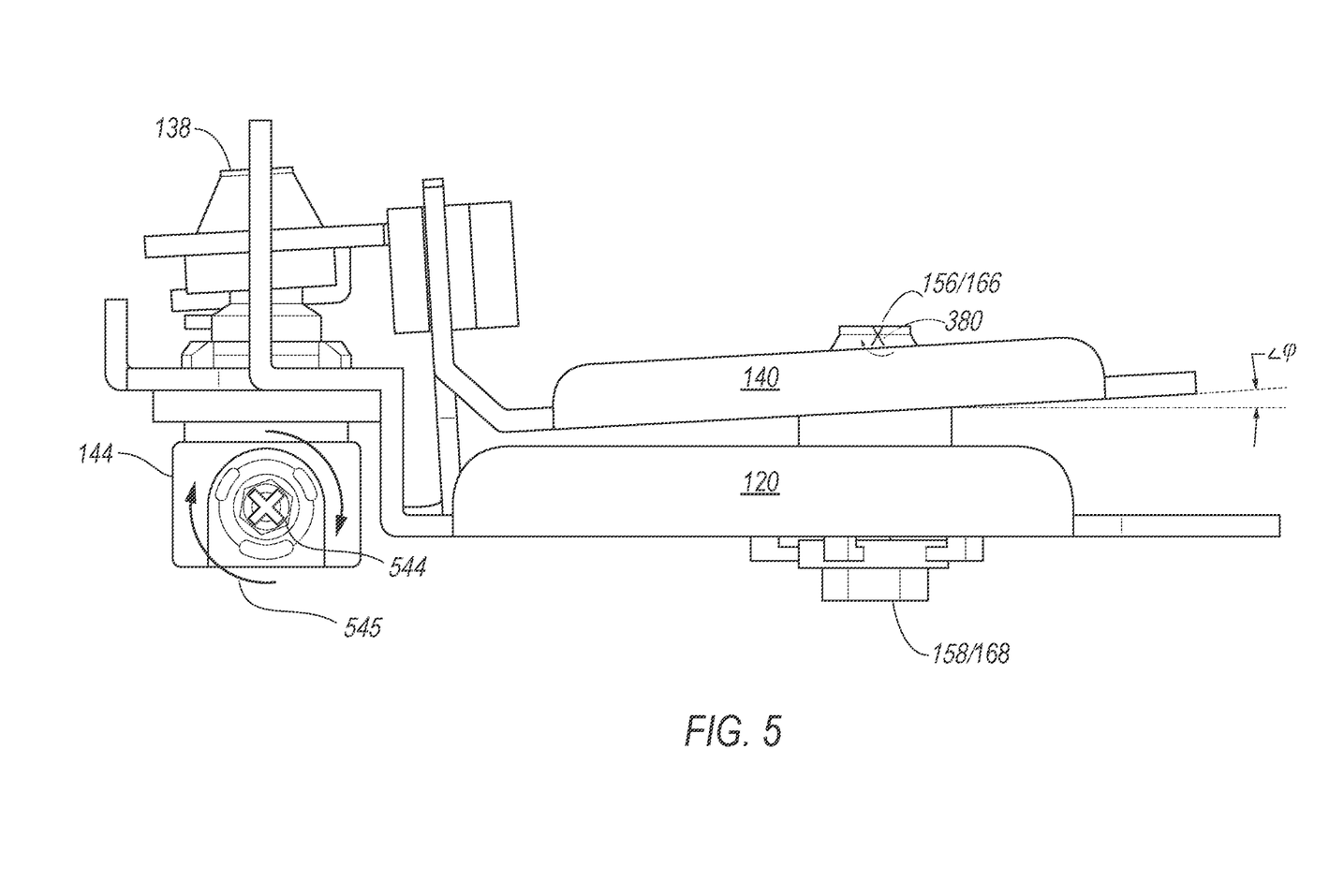
FIG. 5 is a side view of components of the sensor assembly.

FIG. 5 is a side view of components of sensor assembly 118. In the example of FIG. 5, horizontally oriented axis 380, as indicated via an "X," passes through the center point of the rounded surfaces at the first ends of ball studs 150 and 160 within ball stud caps 156/166 (respectively). Via adjustment of first adjustable screw 144, such as by insertion of a tool into receiver 544 of first adjustable screw 144, a rounded first end of the first adjustable screw can be extended or retracted with respect to a second downward facing end of the first adjustable screw. Receiver 544 is shaped to accept an adjustment tool. In an example, receiver 544 may accept a standard screwdriver, standard wrench, or any other suitable tool. Angular rotation of the inserted tool, as indicated by arrow 545, can result in extension or retraction of the rounded first end of first adjustable screw 144. As shown in FIG. 5, extension or retraction of the rounded first end of first adjustable screw 144 results in rotation or tilting of mounting plate 140 by an angle φ about horizontally oriented axis 380.

Figure 6:
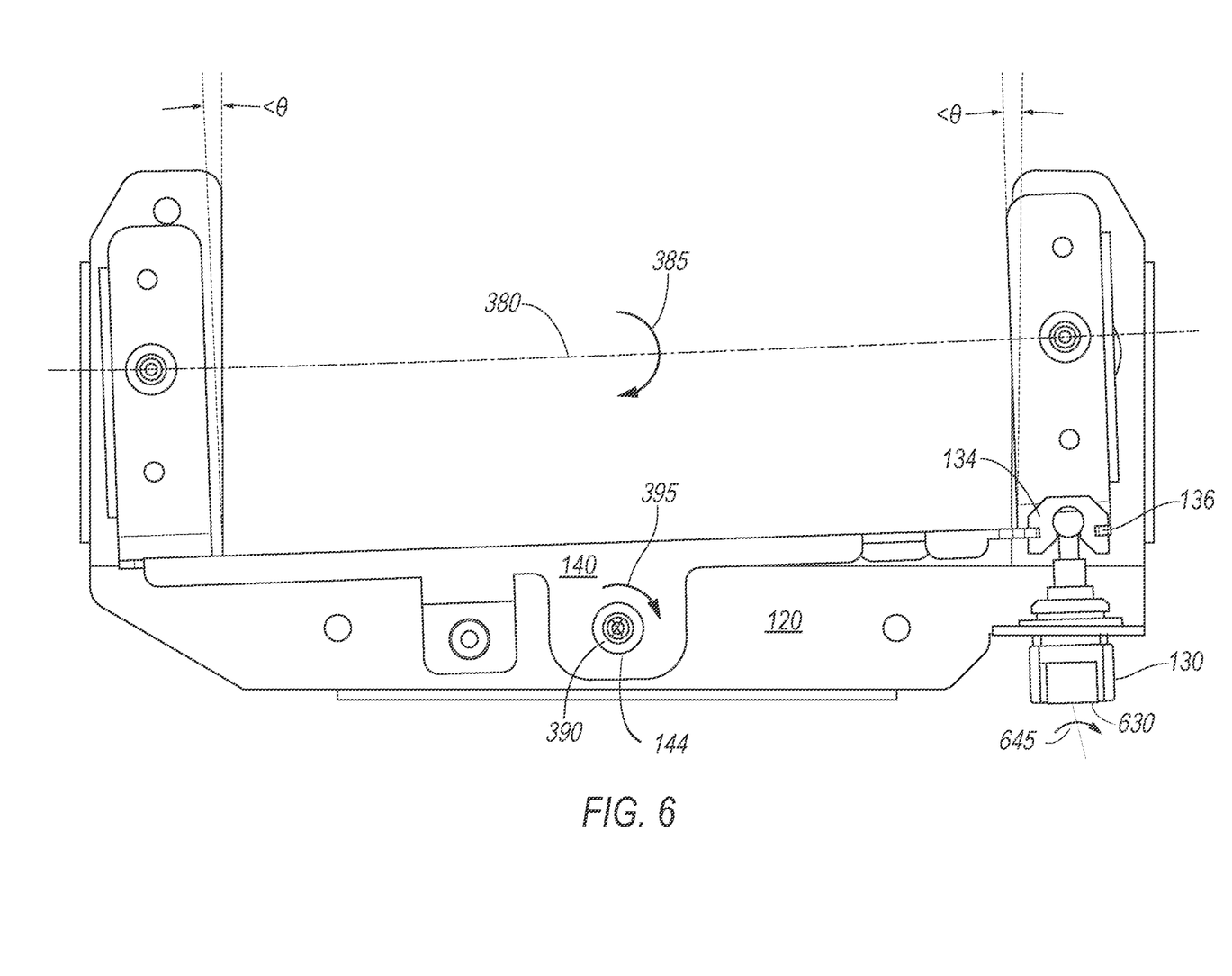
FIG. 6 is a top view of components of the sensor assembly.

FIG. 6 is a top view of components of sensor assembly 118. In the example of FIG. 6, vertically oriented axis 390, as indicated via an "X," passes through rounded surface at a first end of first adjustable screw 144 (beneath ball stud cap 138). Via adjustment of second adjustable screw 130, such as by insertion of a tool into receiver 630 of second adjustable screw 130, a rounded first end of second adjustable screw 130 can be extended or retracted with respect to a second end of the adjustable screw. Receiver 630 is shaped to accept an adjustment tool. In an example, receiver 630 may accept a standard screwdriver, standard wrench, or any other tool. Angular rotation of the inserted tool, as indicated by arrow 645, can result in extension or retraction of the rounded first end of second adjustable screw 130. As shown in FIG. 6, extension or retraction of the rounded first end of second adjustable screw 130 results in rotation or tilting of mounting plate 140 by an angle θ about vertically oriented axis 390.

Figure 7:
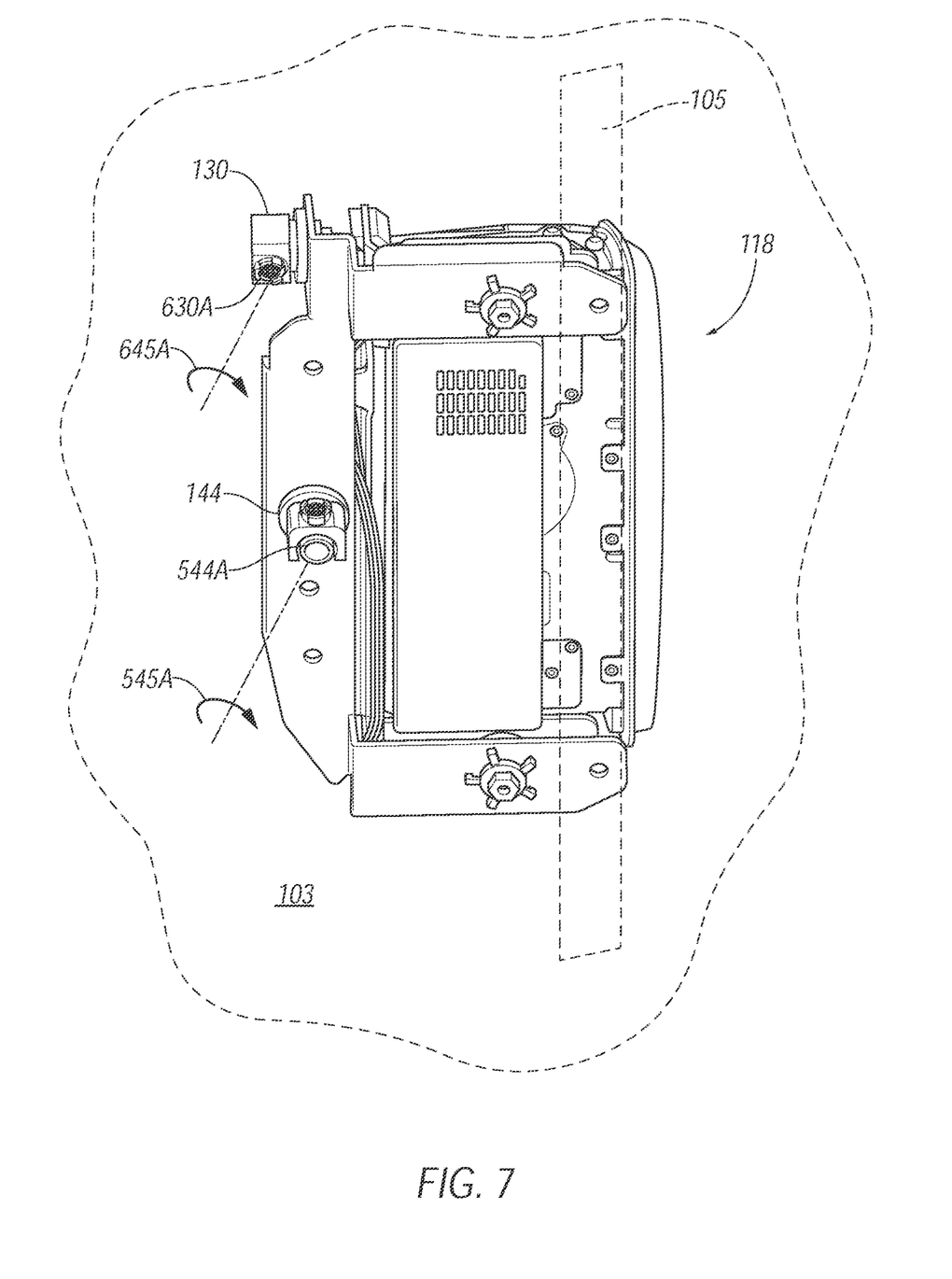
FIG. 7 is a bottom view of the sensor assembly.

FIG. 7 is a bottom view of sensor assembly 118. As shown in FIG. 7, sensor assembly 118 is attached to reinforcing beam 105. In the view of FIG. 7, roof 103 may be transparent or semi-transparent. Although not shown explicitly in FIG. 7, a trim panel may be utilized to obscure sensor assembly 118 from the view of an operator or passenger within the cabin of vehicle 100. In an example, removal of the trim panel can expose and make accessible receivers 545A and 630A, which may be positioned on downward facing surfaces of first adjustable screw 144 and second adjustable screw 130. Accordingly, an operator, passenger, or technician can perform adjustments of mounting plate 140 from within the cabin of vehicle 100.

Figure 8:
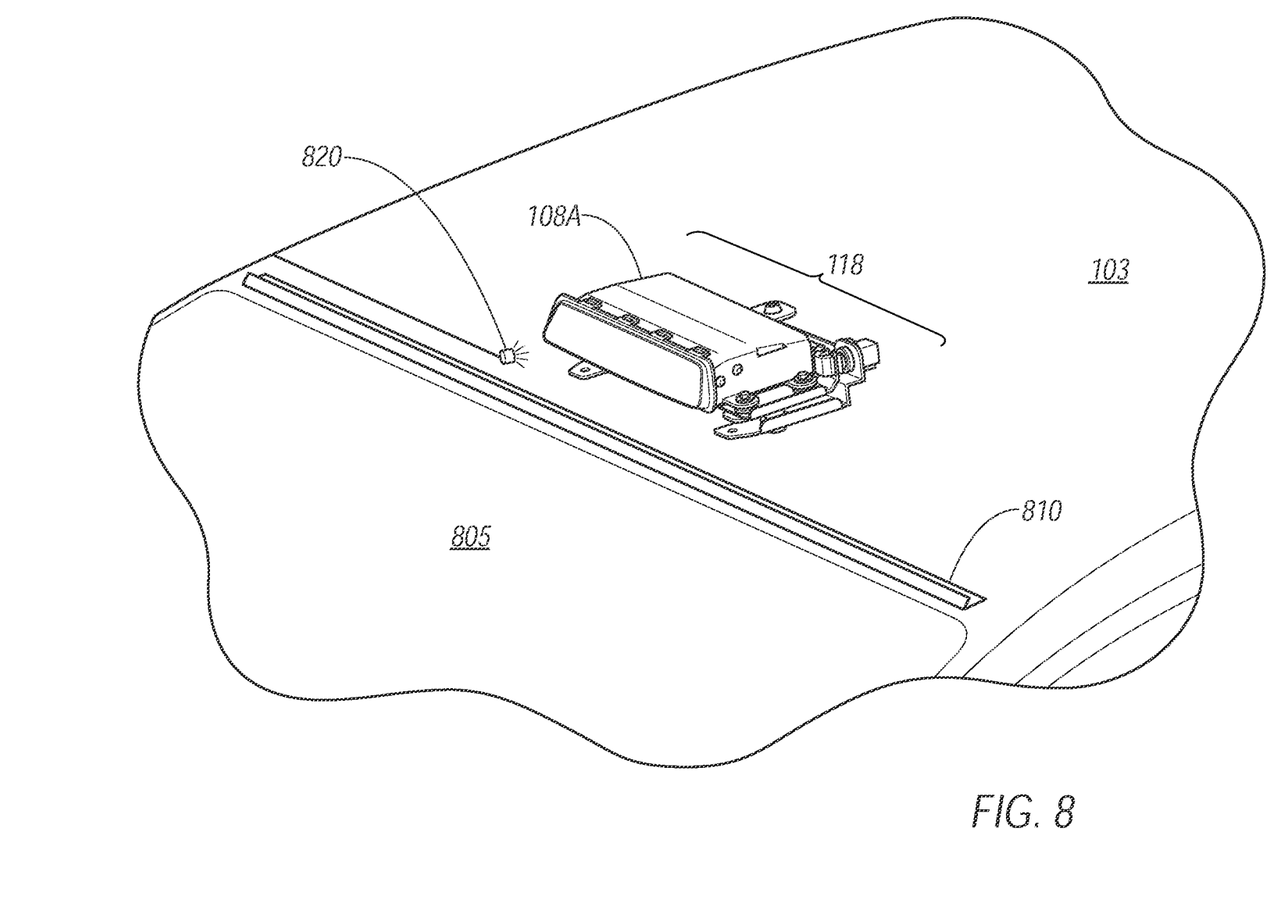
FIG. 8 is a top perspective view of the sensor assembly and a fluid channel on the vehicle.

FIG. 8 is a top perspective view of sensor assembly 118 and a fluid channel on the vehicle. In the example of FIG. 8, sensor assembly 118 can include fluid nozzle 820, which can be fluidly coupled to a washer fluid reservoir. Sensor assembly 118 can include fluid channel 810 positioned to channel fluid incident on lidar sensor 108A away from windshield 805. Accordingly, actuation of a washer fluid pump of vehicle 100 does not result in washer fluid incident on sensor assembly 118 flowing onto windshield 805.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It should further be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

All terms used in the claims are intended to be given their plain and ordinary meanings as understood by those skilled in the art unless an explicit indication to the contrary is made herein. In particular, use of the singular articles, such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor assembly, comprising:
   a carrier plate;
   a mounting plate;
   a sensor on the mounting plate;
   two ball studs attaching the mounting plate to the carrier plate, the ball studs defining a first axis passing through center points of the ball studs;
   a first adjustable screw positioned to tilt the mounting plate about the first axis; and
   a second adjustable screw positioned to rotate the mounting plate about a vertically oriented second axis, the second axis being spaced from the ball studs.

2. The sensor assembly of claim 1, wherein the first axis extends along a lateral dimension with respect to a vehicle that includes the sensor assembly.

3. The sensor assembly of claim 1, wherein the carrier plate is fixed to a reinforcing beam having a first lateral endpoint that is connected to a first structural component at a first side of a vehicle that includes the sensor assembly.

4. The sensor assembly of claim 3, wherein the reinforcing beam includes a second lateral endpoint, opposite the first lateral endpoint, connected to a second structural component at a second side of the vehicle.

5. The sensor assembly of claim 1, further comprising an adjustable spacer that extends from the mounting plate to the carrier plate.

6. The sensor assembly of claim 5, wherein the adjustable spacer includes a downward facing surface that makes frictional contact with a surface of the carrier plate.

7. The sensor assembly of claim 5, wherein the adjustable spacer is spaced from the second axis.

8. The sensor assembly of claim 1, wherein the carrier plate includes a horizontally oriented first slot, the ball studs include a first ball stud, the mounting plate includes a first opening positionable above the first slot, and the first ball stud extends through the first opening and through the first slot.

9. The sensor assembly of claim 8, wherein the carrier plate includes a horizontally oriented second slot, the ball studs include a second ball stud, the mounting plate includes a second opening, and the second ball stud extends through the second opening and through the second slot.

10. The sensor assembly of claim 9, wherein the first slot and the second slot are elongated in circumferential directions relative to the second axis.

11. The sensor assembly of claim 1, further comprising a bushing fixed relative to the mounting plate, the bushing accepting a surface of the second adjustable screw.

12. The sensor assembly of claim 11, wherein the bushing is movable with respect to the carrier plate responsive to adjustment of the second adjustable screw.

13. The sensor assembly of claim 1, further comprising a first torque nut, wherein the ball studs include a first ball stud, the first ball stud is elongated from a first end to a second end, the first ball stud includes a rounded surface at the first end, and the second end of the first ball stud is engaged with the first torque nut.

14. The sensor assembly of claim 13, wherein the first torque nut makes frictional contact with the carrier plate.

15. The sensor assembly of claim 13, further comprising a second torque nut, wherein the ball studs include a second ball stud, the second ball stud is elongated from a first end to a second end, the second ball stud includes a rounded surface at the first end, and wherein the second end of the second ball stud is engaged with the second torque nut.

16. The sensor assembly of claim 1, wherein the first axis is horizontally oriented.

17. The sensor assembly of claim 1, wherein the first adjustable screw is fixed to the carrier plate.

18. The sensor assembly of claim 1, wherein the second adjustable screw is fixed to the carrier plate.

19. The sensor assembly of claim 1, wherein the first adjustable screw includes a receiver shaped to accept an adjustment tool, the receiver of the first adjustable screw being positioned on a surface accessible from inside a vehicle on which the sensor assembly is mounted.

20. The sensor assembly of claim 1, wherein the carrier plate is mounted on a roof of a vehicle, the sensor assembly further including a fluid channel positioned to channel fluid incident on the sensor assembly in a direction away from a windshield of the vehicle.

* * * * *